United States Patent
Tachikura et al.

(10) Patent No.: US 8,764,317 B2
(45) Date of Patent: Jul. 1, 2014

(54) OPTICAL FIBER END PROCESSING METHOD AND OPTICAL FIBER END PROCESSING APPARATUS AND OPTICAL FIBER END

(75) Inventors: Masao Tachikura, Hitachi (JP); Noribumi Shiina, Hitachi (JP); Tatsuo Teraoka, Hitachi (JP); Yoshiyuki Hiramoto, Hitachi (JP); Mitsumasa Zobuchi, Hitachi (JP); Fumi Miyata, Ishioka (JP)

(73) Assignee: Hitachi Metals, Ltd., Tokyo (JP)

( * ) Notice: Subject to any disclaimer, the term of this patent is extended or adjusted under 35 U.S.C. 154(b) by 57 days.

(21) Appl. No.: 13/326,225

(22) Filed: Dec. 14, 2011

(65) Prior Publication Data
US 2012/0170901 A1   Jul. 5, 2012

(30) Foreign Application Priority Data

Jan. 5, 2011   (JP) .................................. 2011-000375

(51) Int. Cl.
*G02B 6/255* (2006.01)
*C03B 37/15* (2006.01)
*B65H 69/02* (2006.01)

(52) U.S. Cl.
USPC ................. 385/96; 385/123; 65/406; 65/407; 156/158; 156/359

(58) Field of Classification Search
USPC ........ 385/123, 39, 95–99, 125–128; 156/158, 156/359; 65/385, 406, 407
See application file for complete search history.

(56) References Cited

U.S. PATENT DOCUMENTS

| | | | |
|---|---|---|---|
| 6,868,213 B2 | 3/2005 | Sasaoka et al. | |
| 7,280,567 B2* | 10/2007 | Luo et al. | 372/6 |
| 8,132,971 B2* | 3/2012 | Luther et al. | 385/83 |
| 2002/0159734 A1 | 10/2002 | Sasaoka et al. | |
| 2004/0008955 A1* | 1/2004 | Patlakh et al. | 385/95 |
| 2006/0062533 A1 | 3/2006 | Hachiwaka et al. | |

FOREIGN PATENT DOCUMENTS

| | | |
|---|---|---|
| JP | 2002-323625 A | 11/2002 |
| JP | 2004-004320 A | 1/2004 |
| JP | 2005-024849 A | 1/2005 |

(Continued)

OTHER PUBLICATIONS

Notification of Reason(s) for Refusal dated Aug. 7, 2013, with English translation.

*Primary Examiner* — Uyen Chau N Le
*Assistant Examiner* — Michael Mooney
(74) *Attorney, Agent, or Firm* — McGinn IP Law Group, PLLC

(57) ABSTRACT

An optical fiber end processing method includes fixing two portions of an optical fiber, heating and fusing the optical fiber between the two fixed portions, to form a first heat fusion region, heating and fusing the optical fiber fixed between the two fixed portions unit while fixing the two fixed portions, moving a heat fusion unit from a side of the first heat fusion region toward a base end side of the optical fiber, and pushing a heat fusion portion of the optical fiber in a direction of shortening a length of the heat fusion portion, to form a second heat fusion region continuous to the first heat fusion region and in which the air holes of the optical fiber disappear; and removing the first heat fusion region by cutting the optical fiber within the second heat fusion region after the second heat fusion forming.

10 Claims, 9 Drawing Sheets

(56) References Cited

FOREIGN PATENT DOCUMENTS

| JP | 2005-301024 A | 10/2005 |
| JP | 2006-350308 A | 12/2006 |
| JP | 2007-212841 A | 8/2007 |
| JP | 2011-107504 A | 6/2011 |

* cited by examiner $F = T_{x1} + T_{x2}$ $F = T_{x1} - T_{x2}$

VERTICAL MICRO ALIGNMENT    HORIZONTAL MICRO ALIGNMENT

OPTICAL FIBER END PROCESSING METHOD AND OPTICAL FIBER END PROCESSING APPARATUS AND OPTICAL FIBER END

The present application is based on Japanese patent application No. 2011-000375 filed on Jan. 5, 2011, the entire contents of which are incorporated herein by reference.

BACKGROUND OF THE INVENTION

1. Field of the Invention

This invention relates to an optical fiber end processing method and an optical fiber end processing apparatus, for processing an end of an optical fiber configured to have a plurality of air holes around a core, and relates to the optical fiber end.

2. Description of the Related Art

In recent years, a new optical fiber having a plurality of air holes around a core, which is called as "holey fiber" or "photonic crystal fiber", has been noted, and its widespread applications to optical communication cords, optical devices, and the like have been studied (see, e.g., Hasegawa, "THE TREND OF DEVELOPMENT IN PHOTONIC CRYSTAL FIBERS AND HOLEY FIBERS," monthly publication "OPTRONICS," The Optronics Co., Ltd. No. 7, pp. 203-208 (2001)).

A typical holey fiber comprises a core, a cladding formed around a circumference of the core, and a plurality of air holes formed around the core in an axial direction of the core.

If the air holes formed in the cladding are open at an end face of the holey fiber, moisture may enter the air holes, or dew may form in the air holes due to temperature variations, leading to lowering in mechanical strength of the holey fiber, or variation in optical characteristics thereof.

Also, when the optical fibers are spliced together by use of a splicing member such as a mechanical splice, an MT connector, or the like, there is used a method to fill a gap between connected end faces of one of the optical fibers and the other thereof with a liquid material for refractive index matching, so as to reduce reflection and loss at the connected end faces. When this connecting method is applied to the holey fiber with the air holes being open at the end face of the holey fiber, the liquid refractive index matching material is likely to flow from the connected end faces into the air holes. This may cause the liquid refractive index matching material at the connected end faces to run out, leading to significant reflection and connection loss.

Also, in a single fiber optical connector requiring no refractive index matching material, there is a problem that when the end face of the holey fiber is ground (polished), an abrasive or grinding swarf thereof enters the air holes, thereafter comes out from the air holes and get stuck between the connected end faces in such a manner as to cause damage to the fiber end face, or an air gap therein, thereby degrading the optical characteristics of the holey fiber.

The following techniques to solve the above problems have been suggested.

JP-A-2004-4320 discloses a method of plugging openings of pores (air holes) in an end face of a photonic crystal fiber with a plugging material having a refractive index lower than a refractive index of a core.

JP-A-2002-323625 discloses a method of sealing hollow portions (air holes) of an optical fiber by heating an end face of the optical fiber to soften a cladding, thereby collapsing the hollow portions, or by filling the hollow portions with a resin to seal the hollow portions.

JP-A-2005-24849 discloses a method of fusion plugging air holes by arc discharge at a position distant from an end face of an optical fiber.

Refer to, e.g., JP-A-2004-4320, JP-A-2002-323625, JP-A-2005-24849, and Hasegawa, "THE TREND OF DEVELOPMENT IN PHOTONIC CRYSTAL FIBERS AND HOLEY FIBERS," monthly publication "OPTRONICS," The Optronics Co., Ltd. No. 7, pp. 203-208 (2001).

SUMMARY OF THE INVENTION

An advantage of the air hole sealing method by heating to fuse the optical fiber having the air holes per se as disclosed by JP-A-2002-323625 is as follows. Namely, it is possible to completely prevent the water and the like from entering into the air holes, thereby suppressing aging deterioration, in comparison with the air hole sealing method by use of the plugging material formed of a resin as disclosed by JP-A-2004-4320. It should be noted, however, that the method by fusing the optical fiber end face has the following disadvantages: The core shape is irregular to tend to cause the optical loss. Heating a cantilevered optical fiber end face causes unbalanced circumferential surface tension of the fused optical fiber to bend or expand the heated portion, thus making it difficult to form a desired shape. The optical fiber end expands, thus being difficult to fit into a connector ferrule hole.

Also, in the method disclosed by JP-A-2005-24849, it is important to fix two portions of the optical fiber end to V-shaped grooves respectively, enhance the positional accuracy between the two V-shaped grooves, and minimize the optical fiber axial misalignment and angle misalignment between the two V-shaped grooves, thereby reduce the bending of the collapsed portion of the air holes due to heat fusion. However, even through the positional accuracy between the two V-shaped grooves is enhanced, there are the following disadvantages: Although the optical fiber is mounted on the V-shaped grooves after removal of the coating, a residue of the coating is likely to remain on a surface of the optical fiber, and this coating residue is likely to adhere to the V-shaped grooves or a V-shaped groove holder. As a result, the optical fiber positioning accuracy of the V-shaped groove part may be deteriorated, thereby deforming or bending the collapsed portion of the air holes of the optical fiber. In addition to the coating residue, floating dusts in the air, or fibers of a cleaning cotton applicator may adversely affect it. Also, the inaccuracy of the V-shaped grooves, or the incompleteness of the V-shaped groove holder causes slight deformation or bend to the plugged portions of the air holes of the optical fiber. Therefore, the collapsed portion of the air holes is provided as a connector end face, the occurrence of variations in connection loss cannot be avoided. For the above reasons, in the method disclosed by JP-A-2005-24849, the connector end face is formed as such a non-collapsed air hole portion that the collapsed air hole portion is built in the connector ferrule, but this method forcedly deforms the collapsed air hole portion, and that collapsed air hole portion may therefore be broken due to long-term use. Also, there is a disadvantage that grinding swarf tends to remain in the air holes, since the air holes are exposed at the end face of the connector.

As a method for sealing the air holes of the holey fiber, a method of fusion splicing a general optical fiber to a connecting end face of the holey fiber may be proposed. However, this method tends to cause axial misalignment, angle misalignment, or expansion of the fusion spliced portion. The occurrence of such axial misalignment, angle misalignment, or expansion makes difficult the attachment of the holey fiber to the ferrule. This method therefore has such a disadvantage with workability or reliability that the surface of the holey fiber tends to be damaged during the attachment thereof. Also, this method tends to cause excessive connection loss in the fusion spliced portion between the holey fiber and the optical fiber in comparison with the method of heating to fuse and collapse the optical fiber between the two V-shaped grooves as disclosed by JP-A-2005-24849.

Accordingly, it is an object of the present invention to provide an optical fiber end processing method and an optical fiber end processing apparatus, and an optical fiber end, by which it is possible to largely reduce an increase in connection loss resulting from sealing at the end of an optical fiber having air holes, such as a holey fiber or the like.

According to a first feature of the invention, an optical fiber end processing method for processing an end of an optical fiber comprising a core, a cladding provided around a circumference of the core, a plurality of air holes formed around the core within the cladding and along an axial direction of the core, comprises:

an optical fiber fixing step of fixing two portions of an optical fiber;

a first heat fusion region forming step of heating and fusing the optical fiber between the two fixed portions by a heat fusion means after the optical fiber fixing step, to form a first heat fusion region in the optical fiber;

a second heat fusion region forming step of heating and fusing the optical fiber between the two fixed portions by the heat fusion means while fixing the two fixed portions after the first heat fusion region forming step, moving the heat fusion means from a side of the first heat fusion region toward a base end side of the optical fiber, and pushing a heat fusion portion of the optical fiber in a direction of shortening a length of the heat fusion portion along the axial direction in synchronization with a movement of the heat fusion means, to form a second heat fusion region which is continuous to the first heat fusion region and in which the air holes of the optical fiber disappear; and a removal step of removing the first heat fusion region by cutting the optical fiber within the second heat fusion region after the second heat fusion region forming step.

In the optical fiber end processing method, the optical fiber may further comprise a core coating formed around a circumference of the cladding, in which the optical fiber fixing step may further comprise removing the coating located at the end of the optical fiber to expose a part of the cladding, and fixing a bared portion of the exposed cladding of the optical fiber and a portion of the coating as the two fixed portions.

In the optical fiber end processing method, the heat fusion portion of the optical fiber may be pushed in the direction to shorten the length of the heat fusion portion in the axial direction such that a diameter of the optical fiber located in the second heat fusion region is substantially equal to a diameter of the optical fiber at a non-heated portion which is not heated by the heat fusion means in the second heat fusion region forming step.

According to a second feature of the invention, an optical fiber end processing method for processing an end of an optical fiber comprising a core, a cladding provided around a circumference of the core, a plurality of air holes formed around the core within the cladding and along an axial direction of the core, comprises:

a fiber fixing step of fixing the optical fiber and a supporting fiber in a state where end faces of the optical fiber and the supporting fiber are facing to each other;

a spliced heat fusion region forming step of heating and fusing the optical fiber and the supporting fiber by a heat fusion means after the fiber fixing step, thereby fusion splicing the optical fiber and the supporting fiber to form a spliced heat fusion region;

a fiber heat fusion region forming step of heating and fusing the optical fiber by the heat fusion means while fixing the optical fiber and the supporting fiber after the spliced heat fusion region forming step, moving the heat fusion means from a side of the spliced heat fusion region toward a side of the optical fiber, and pushing a heat fusion portion of the optical fiber in a direction of shortening a length of the heat fusion portion along the axial direction in synchronization with a movement of the heat fusion means, to form a fiber heat fusion region which is continuous to the spliced heat fusion region and in which the air holes of the optical fiber disappear; and a removal step of removing the spliced heat fusion region by cutting the optical fiber within the fiber heat fusion region after the fiber heat fusion region forming step.

In the optical fiber end processing method, the heat fusion portion of the optical fiber may be pushed in the direction to shorten the length of the optical fiber in the axial direction such that a diameter of the optical fiber located in the fiber heat fusion region is substantially equal to a diameter of the optical fiber at a non-heated portion which is not heated by the heat fusion means in the second heat fusion region forming step.

In the optical fiber end processing method, the end of the optical fiber after the end processing may be inserted, bonded and fixed to a ferrule, an end face of the ferrule is thereafter ground, and a region in which the air holes disappear at the end of the optical fiber is positioned at the end face of the ferrule after being ground.

According to a third feature, an optical fiber end processing apparatus for performing the optical fiber end processing method, comprises:

a fiber fixing means for fixing the two portions of the optical fiber;

the heat fusion means for heating and fusing the optical fiber;

a control means for controlling the heat fusion means to form the first heat fusion region and the second heat fusion region in the optical fiber between the two fixed portions fixed by the fiber fixing means; and a pushing means for pushing the heat fusion portion of the optical fiber in the direction of shortening the length of the heat fusion portion along the axial direction when the second heat fusion region is formed.

According to a fourth feature, an optical fiber end processing apparatus for performing the optical fiber end processing method, comprises:

a fiber fixing means for fixing the optical fiber and the supporting fiber;

the heat fusion means for heating and fusing the optical fiber and the supporting fiber;

a control means for controlling the heat fusion means to form the spliced heat fusion region and the fiber heat fusion region in the optical fiber and the supporting fiber fixed by the fiber fixing means; and a pushing means for pushing the heat fusion portion of the optical fiber in the direction of shortening the length of the heat fusion portion along the axial direction when the fiber heat fusion region is formed.

According to a fifth feature of the invention, an optical fiber end of an optical fiber comprising a core, a cladding provided around a circumference of the core, a plurality of air holes formed around the core within the cladding and along an axial direction of the core, is characterized by that an air hole-disappearing portion in which air holes disappear is formed at a tip of the optical fiber, in which a difference between an outer diameter of the optical fiber and an outer diameter of the air hole-disappearing portion is within ±1.0 µm, in which a length of the air hole-disappearing portion is 1 mm or more, in which a diameter of each of the air holes is reduced toward the air hole-disappearing portion at the tip of the optical fiber to be a tapered shape, in which the core has substantially neither bent nor level difference and is continuous along the axial direction in the air hole-disappearing portion.

According to a sixth feature of the invention, an optical fiber end processing method comprises:

an optical fiber fixing step of fixing two portions of an optical fiber including air holes in a cladding, the air holes extending along an axial direction;

a heating step of heating the optical fiber fixed between the two fixed portions in the optical fiber fixing step; and an optical fiber pushing step of pushing the optical fiber to shorten a length of the optical fiber between the two fixed portions when heating the optical fiber in the heating step.

In the optical fiber end processing method, the heating step may be performed to heat the optical fiber from a tip side to a base end side of the optical fiber.

Effects of the Invention

According to the present invention, it is possible to provide a highly reliable optical fiber end with a high workability, by which it is possible to largely reduce an increase in connection loss resulting from sealing at the end of an optical fiber having air holes, such as a holey fiber or the like.

BRIEF DESCRIPTION OF THE DRAWINGS

The preferred embodiments according to the invention will be explained below referring to the drawings, wherein:

FIGS. 8A and 8B are histograms showing a connector connection loss at the holey fiber end, wherein FIG. 8A is a histogram showing connector connection loss at the holey fiber end when the fiber is pushed, and FIG. 8B is a histogram showing connector connection loss at the holey fiber end when the fiber is not pushed;

FIGS. 9A and 9B are schematic diagrams is a typical diagram showing a portion around a boundary between a fusion sealed portion and a non-sealed portion, in order to explain the difference of whether or not a bend occurs in the fusion sealed portion of the fiber, wherein FIG. 9A is a schematic diagram showing the boundary between the fusion sealed portion and the non-sealed portion when the fiber is pushed, and FIG. 9B is a schematic diagram showing the boundary between the fusion sealed portion and the non-sealed portion when the fiber is not pushed.

DETAILED DESCRIPTION OF THE PREFERRED EMBODIMENTS

Next, an optical fiber end processing method, an optical fiber end processing apparatus, and an optical fiber end in preferred embodiments according to the invention will be explained below.

(First Preferred Embodiment)

(Structure of a Holey Fiber 1)

Figure 1A:
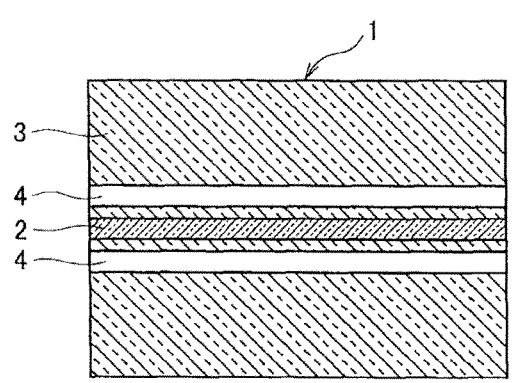
FIGS. 1A and 1B are longitudinal and transverse cross sectional views, respectively, showing a structure of the holey fiber used in first and second preferred embodiments according to the invention.
Figure 1B:
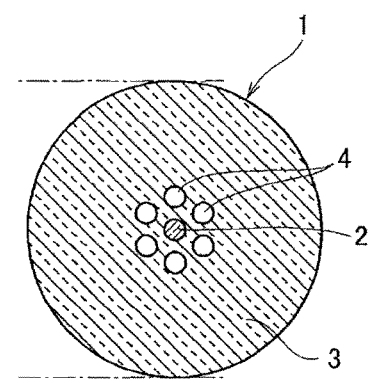

FIGS. 1A and 1B show a holey fiber 1 used in an optical fiber end processing method in a first preferred embodiment according to the invention. FIG. 1A is a longitudinal cross sectional view of the holey fiber 1, and FIG. 1B is a transverse cross sectional view of the holey fiber 1. This holey fiber 1 shown in FIGS. 1A and 1B comprises a core 2, a cladding 3 formed around a circumference of the core 2, and a plurality of air holes 4 formed in the cladding 3 along an axial direction of the core 2 to surround the circumference of the core 2. The holey fiber 1 in this preferred embodiment is provided with six air holes 4 positioned, respectively, at vertices of a regular hexagon centered around the core 2. Also, the holey fiber 1 in this preferred embodiment is formed of a silica based material, in which the core 2 is doped with e.g. germanium (Ge), so that the refractive index of the core 2 is higher than the refractive index of the cladding 3. A circumference of the holey fiber 1 is typically protected by polymer coating such as an ultraviolet curable resin or the like, and when connected with a connector or the like, the coating at an end of the holey fiber 1 is peeled off, so that a bare (exposed) end of the holey fiber 1 is connected with the connector or the like.

Herein, the optical fiber according to the invention is not limited to the holey fiber 1 as shown in FIGS. 1A and 1B, and may be configured to have the plurality of air holes 4 formed around the core 2 along the axial direction of the core 2, and is exemplified by the holey fiber, the photonic crystal fiber and the like. In the optical fiber (holey fiber 1) as shown in FIGS. 1A and 1B configured to have the air holes 4, the refractive index of the core 2 is higher than the refractive index of the cladding 3. However, the optical fiber according to the invention may be an optical fiber with a core comprising the same material as a cladding, and configured to have air holes regularly arrayed around the core. The optical fiber having such a configuration is typically called as "photonic crystal fiber", in which a multiplicity (typically several dozens) of air holes are arrayed in a honeycomb lattice or the like, to form a photonic crystal structure or a photonic band gap structure.

(Optical Fiber End Processing Method)

FIGS. 2A to 2F show each step of an optical fiber end processing method in the first preferred embodiment according to the invention. FIGS. 2A to 2F are plan views showing optical fiber end processing using an optical fiber end processing apparatus, when viewed from above.

Figure 2A:
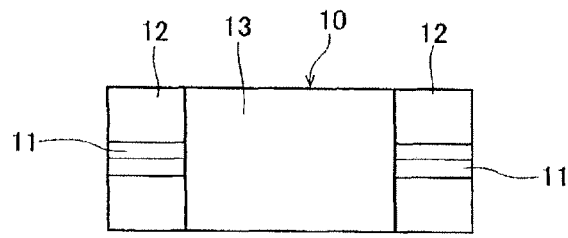
FIGS. 2A to 2F are diagrams showing processing steps of an optical fiber end processing method in the first preferred embodiment according to the invention.
Figure 2B:
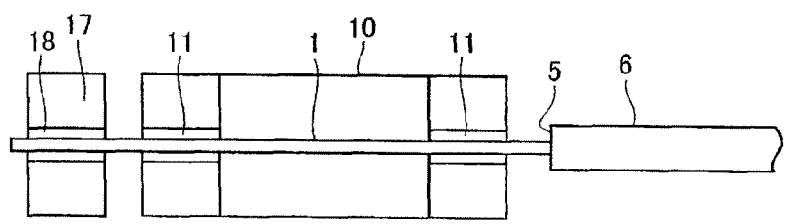

FIG. 2A shows a V-shaped groove part 10 for fixing an end of the holey fiber 1. The V-shaped groove part 10 has V-shaped grooved portions 12 as fixing portions at both ends of the V-shaped groove part 10, and the V-shaped grooved portions 12 are provided with V-shaped grooves 11 respectively for mounting the holey fiber 1. Herein, the term "V-shaped" means a concave shape having a triangular or substantially triangular cross section. Between the V-shaped grooved portions 12, there is a vacant portion (air gap portion) 13 in which the holey fiber 1 is heated. Such a V-shaped groove part 10 is similar to a V-shaped groove part with an air gap in its middle portion, which is made by high-precision integral processing and used for a commercial optical fiber fusion splicer. The V-shaped grooves 11 at both the ends of the V-shaped groove part 10 are processed with high precision to suppress mutual positional misalignment, so that when optical fibers are mounted and fixed to the V-shaped grooves 11 on both sides, respectively, of the air gap portion 13, the two optical fibers are axially aligned with each other. A recent fusion splicer has a V-shaped groove part formed with multiple V-shaped grooves to allow splicing fiber ribbons together. Such a V-shaped groove part with multiple V-shaped grooves may be used. In that case, for the fiber ribbons with built-in holey fibers, it is possible to carry out a batch process on plural holey fiber ends together.

Similarly to other optical fibers, the holey fiber is used with a polymer coating formed therearound, but it is necessary to remove the coating from the holey fiber when splicing the fibers together, or connecting the holey fiber to an optical part. Also, when the air holes 4 of the holey fiber 1 are plugged or sealed, a coating 5 of a coated holey fiber 6 is first removed to bare the holey fiber 1, and referring to FIG. 2B, two portions at an end of the holey fiber 1 are set in the V-shaped grooves 11 on both the sides, respectively, of the gap portion 13 to extend over the gap portion 13. Further, a tip side of the holey fiber 1 of the V-shaped groove part 10 is provided with a pushing motion mount 17, so that a tip of the holey fiber 1 is set in a V-shaped groove 18 of the pushing motion mount 17. The pushing motion mount 17 has a mechanism for moving slowly in parallel to a longitudinal direction of the holey fiber 1, and is configured to allow pushing the tip of the holey fiber 1 toward a base end side of the holey fiber 1. Incidentally, the coated holey fiber 6 is also fixed to on a support (not shown) so as not to move.

Figure 2C:
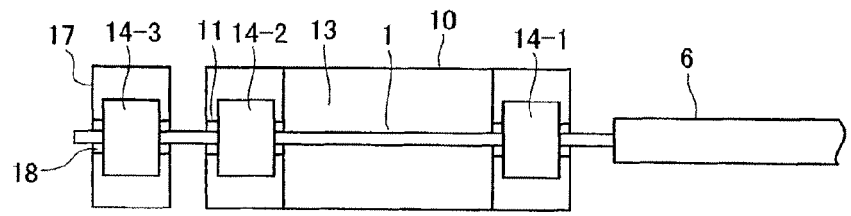

Referring next to FIG. 2C, the holey fiber 1 is supported and fixed with V-shaped groove holders 14-1 and 14-2 such that the holey fiber 1 properly fits in the V-shaped grooves 11 at both the ends of the V-shaped groove part 10. Also, the tip of the holey fiber 1 is supported and fixed with a V-shaped groove holder 14-3 such that the holey fiber 1 properly fits in the V-shaped groove 18 of the pushing motion mount 17.

In order to carry out the pushing process with the use of the pushing motion mount 17 in a subsequent step, the V-shaped groove holder 14-2 fixes the holey fiber 1 with such a structure and holding force that the holey fiber 1 is slidable without the axial misalignment in the V-shaped groove 11 at the left end of the V-shaped groove part 10 (i.e. movable in the V-shaped groove 11 smoothly in parallel to the longitudinal direction of the holey fiber 1 and in the right direction in FIG. 2C), while the V-shaped groove holders 14-1 and 14-3 securely fix the holey fiber 1 so as to prevent the holey fiber 1 from sliding and moving in the V-shaped groove 11 at the right end of the V-shaped groove part 10 and the V-shaped groove 18 of the pushing motion mount 17, respectively.

Next, the holey fiber 1 is fused by electric discharge heating between the V-shaped grooves 11 of the V-shaped groove part 10. The electric discharge heating is performed by arranging e.g. a pair of discharge electrodes 15 in the gap portion 13. A discharge plasma region 16 is formed between the discharge electrodes 15, and the holey fiber 1 in the discharge plasma region 16 is heated. The discharge electrodes 15 may be connected with a discharge circuit, which is similar to the commercial fusion splicer.

Figure 2D:
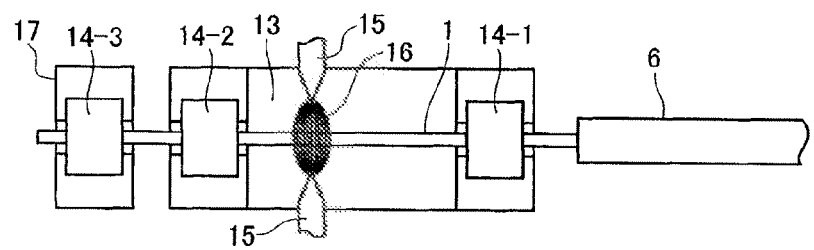

Referring to FIG. 2D, at the start of the electric discharge heating, a portion at the tip of the holey fiber 1 between the V-shaped grooves 11, fixed with the V-shaped groove holders 14-1 and 14-2 is first heated, so that the heated portion of the holey fiber 1 is fused to be deformable.

At this point, if residue of the coating 5 or the like removed from the coated holey fiber 6 adheres to the V-shaped grooves 11 or the V-shaped groove holders 14-1, 14-2, the holey fiber 1 will be held in the state of the axial misalignment or angle misalignment between the V-shaped grooved portions 12 at both the ends of the V-shaped groove part 10, resulting in stress in the holey fiber 1 (Also, the axial misalignment or angle misalignment may be caused by the inaccuracy of the V-shaped grooves 11 themselves in the V-shaped grooved portions 12, or the incompleteness of the V-shaped groove holders 14-1, 14-2). For this reason, the fused portion of the holey fiber 1 fused by electric discharge heating deforms to relax the stress of the non-fused portion.

(The Deformation of the Fused Portion)

Figure 3A:
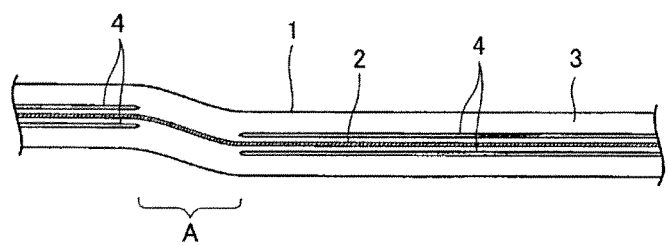
FIGS. 3A and 3B are explanatory diagrams for explaining a processing principle of the optical fiber end processing method in the first preferred embodiment according to the invention.
Figure 3B:
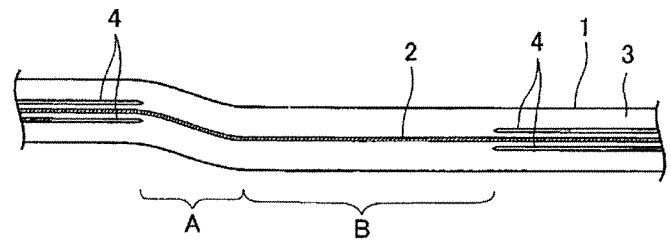

Here, the deformation of the fused portion will be explained in more detail with referring to explanatory diagrams of FIGS. 3A and 3B for explaining a processing principle of the optical fiber end processing method. FIGS. 3A and 3B are schematic diagrams of the holey fiber 1 assuming that the holey fiber 1 is axially misaligned between the V-shaped grooved portions 12 when held in the V-shaped grooved portions 12. FIG. 3A shows a state of the holey fiber 1 just after carrying out a start (initial step) of the electric discharge heating. The holey fiber 1 deforms in a first heat fusion region A that is the heated portion at the tip of the holey fiber 1 (at the start of electric discharge heating). In other words, as a result of fusing the first heat fusion region A by the electric discharge heating, deformation corresponding to the axial misalignment of the holey fiber 1 is generated in the first heat fusion region A, so as to relax the stress caused in the holey fiber 1 that is held in the axially misaligned state. Accordingly, the stress of the entire holey fiber 1 between the V-shaped grooved portions 12 is relaxed at the end of the electric discharge heating. As a result of this stress relaxing, a base end (in FIG. 3A, right end) of the holey fiber 1 is made straight with no stress relative to the first heat fusion region A.

Referring again to FIG. 2E, after the formation of the first heat fusion region A by starting the electric discharge heating, the electric discharge heating is continued without stopping the electric discharge, and the discharge electrodes 15 are moved from a first heat fusion region A side to a base end side (right end side) of the holey fiber 1, while the pushing motion mount 17 is motioned at an appropriate speed in the same direction as the discharge electrodes 15, to push the holey fiber 1 toward the base end side thereof, thereby forming a second heat fusion region B in which the air holes 4 disappear.

Accordingly, the air holes 4 disappear continuously from the first heat fusion region A to the second heat fusion region B. Also, the second heat fusion region B has a larger region in which the air holes 4 disappear than the first heat fusion region A.

Also, in the holey fiber 1 fused by heating, the air holes 4 inside naturally get to small due to surface tension of fused glass, and the air holes 4 gradually disappear in the holey fiber 1 which is reduced in diameter. However, the fused glass is provided into the air holes 4 by pushing the holey fiber 1 in appropriate conditions, so that the air holes 4 are filled and sealed with the fused glass. Therefore, it is possible to hold the outer diameter of the sealed portion equal to the outer diameter of the non-sealed portion with the air holes 4 (i.e. it is possible to hold the optical fiber outer diameter substantially constant before and after the electric discharge heating). According to this process, the desired and sealed portion with no air hole (i.e. air-hole disappearing portion in which the air holes 4 disappear) is formed.

Here, although the tip side portion of the holey fiber 1 has been pushed to the base end side thereof to reduce the air holes 4, the base end side portion of the holey fiber 1 may be pushed to the tip side thereof. Namely, the heat fused portion of the holey fiber 1 may be pushed to shorten the axial length thereof, so that the outer diameter of the sealed portion is kept equal to the outer diameter of the non-sealed portion. A relationship between the fiber pushing conditions and the sealed portion outer diameter will be described in detail later.

The first heat fusion region A at the start point of the electric discharge heating significantly deforms in a poor fiber fixing state due to the axial misalignment between the fixing portions of the holey fiber 1 or the like, and also causes significant optical loss when light is passed therethrough. The stress of the holey fiber 1 can be removed by significantly deforming the first heat fusion region A, thereby holding the holey fiber 1 straight at the base end side relative to the first heat fusion region A.

FIG. 3B shows a state after the formation of the second heat fusion region B. At the first heating, the electric discharge is applied to the holey fiber in a stationary state until the holey fiber is fused and its stress disappear. At the second heating continuous to the first heating, the holey fiber 1 is then pushed in appropriate conditions without resistance to the surface tension of the fused glass. Therefore, the outer diameter of the second heat fusion region B hardly varies, and only deformation is disappearance of the air holes 4 (Although the outer diameter of the first portion may vary depending on fiber pushing timing, this first portion with the varied outer diameter is also removed by cutting the holey fiber 1 within the second heat fusion region B as described later). Accordingly, the straightness of the core 2 of the holey fiber 1 can be kept, so that the increase in the optical loss in the second heat fusion region B is small when the light is propagated through the second heat fusion region B.

(Optical Fiber End Processing Apparatus)

Next, an optical fiber end processing apparatus will be explained below. The optical fiber end processing apparatus comprises an electric discharge heating control means for controlling electric discharge heating in a wide range along a longitudinal direction of the holey fiber 1 between the two V-shaped grooves 11 fixed by the V-shaped groove part 10 with the discharge electrodes 15, 15, a pushing means having a mechanism for pushing the heat fused portion of the holey fiber 1 to shorten the length thereof, separately from the V-shaped groove part 10, and a pushing control means for controlling pushing velocity of the pushing means. The electric discharge heating control means is programmed to perform a continuous formation of the two heat fusion regions A and B, and the pushing control means is programmed to perform optical fiber pushing in synchronization with the continuous formation, thereby performing the automatic electric discharge heating to form the sealed portion.

Next, referring again to FIG. 2F, after detaching the holey fiber 1 from the optical fiber end processing apparatus, the holey fiber 1 is cut within the second heat fusion region B, e.g. at the midway point of the second heat fusion region B, to remove at least the first heat fusion region A.

In the case that the holey fiber 1 is attached to a connector ferrule, an amount to be ground is taken into account, so that the length of the sealed portion (the second heat fusion region B) may be set to be long, or a position C to be cut within the second heat fusion region B may be adjusted, to make the exposed length of the cladding 3 long. In the present invention, the accuracy of the position C to be cut is not relevant because the length of the sealed portion can be lengthened by only setting an electrode movement amount during electric discharge.

(One Embodiment of the Optical Fiber End Processing Method)

Figure 4:
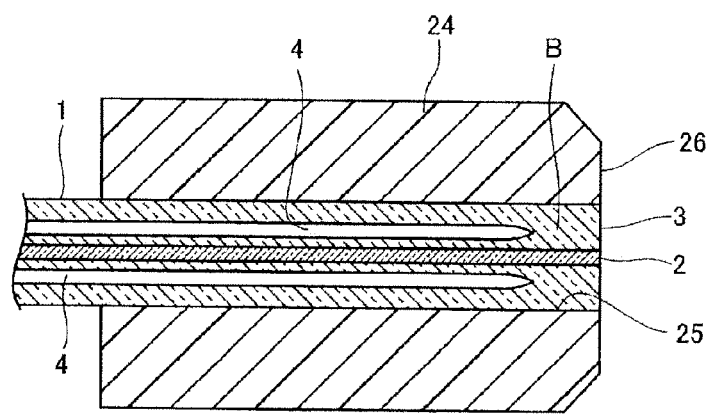
FIG. 4 is a longitudinal cross sectional view showing a holey fiber end mounted with a ferrule at the end of the holey fiber fabricated by an optical fiber end processing method in an embodiment in the first and second preferred embodiment according to the invention.

FIG. 4 is a longitudinal cross sectional view showing an optical fiber end processing method for mounting a ferrule 24 at an end of the holey fiber 1 in an embodiment in the first and second preferred embodiment according to the invention. The holey fiber 1 including the second heat fusion region B at its processed end is inserted into, bonded and fixed to a fiber guiding hole 25 of the ferrule 24, followed by grinding a ferrule end face 26. The second heat fusion region B is located at the ferrule end face 26 after being ground, and the second heat fusion region B is the region with no air hole 4 at the end of the holey fiber 1. The ferrule 24 of FIG. 4 includes a holding portion of the coated holey fiber 6 (not shown).

Figure 2E:
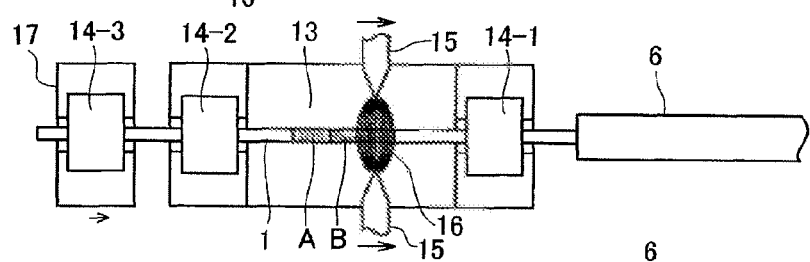
Figure 2F:
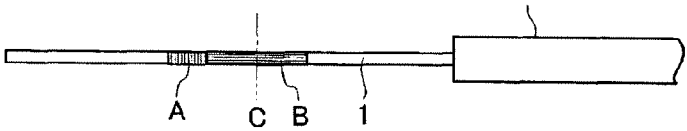

In the electric discharge heating while moving the discharge electrodes 15 shown in FIG. 2E of the above embodiment, by pushing (compressing) the holey fiber 1 in the direction for shortening the length of the holey fiber 1, it is possible to prevent or alleviate the diametrical reduction of the sealed portion (the second heat fusion region B) caused by air hole disappearance due to surface tension. The advantage in this process will be explained below.

In the case that the holey fiber 1 is not pushed or compressed, the outer diameter of the sealed portion is smaller than the outer diameter of the non-sealed portion, and the sealed portion can therefore easily be inserted into the fiber guiding hole 25 of the connector ferrule 24, even if the sealed portion is slightly bent, or axially misaligned. In that case, at the tip of the ferrule 24, the sealed portion of the holey fiber 1 is eccentric with respect to the fiber guiding hole 25 of the connector ferrule 24, therefore resulting in significant connector connection loss. There is the significant problem in that this connection loss defect can be found only after bonding and fixing to the ferrule 24. Also, there is the problem that determining acceptance or rejection thereof is time consuming.

If it is possible to prevent the outer diameter of the sealed portion from varying by pushing or compressing the holey fiber 1, when the holey fiber 1 is bent, axially misaligned or deformed, the sealed portion will not be inserted into the fiber guiding hole 25 of the connector ferrule 24. Accordingly, the defect can be excluded in the step of inserting the optical fiber into the fiber guiding hole 25 of the connector ferrule 24. Therefore, it is advantageous in requiring no particular inspection.

Also, in this embodiment, because the holey fiber (bare fiber) 1 bared by removing the coating 5 of the coated holey fiber 6 is fixed to the two V-shaped grooves 11, care is taken by taking such means as material selection, surface smoothing or surface protecting coating of the V-shaped grooves 11 or the V-shaped groove holder 14-1 such that the surface of the bare fiber located on the base end side (right end side in FIGS. 2B to 2F) of the holey fiber 1 and contacted with the V-shaped grooves 11 is not flawed and deteriorated in strength.

Besides these means, the V-shaped groove holder 14-1 may hold the end of the coating 5 of the coated holey fiber 6, while the V-shaped groove holder 14-2 may hold the holey fiber (bare fiber) 1. For realizing the above function, it is important that the shape and dimensions of the V-shaped groove 11 located in the V-shaped groove holder 14-1 are also altered to fit to the coated holey fiber 6 such that the core 2 is not likely to cause the relative axial misalignment between both the fixed portions of the holey fiber 1 when supported and fixed with the V-shaped groove holders 14-1 and 14-2.

If several dozens of microns of significant axial misalignment is caused by variations in coating dimensions, holding force or the like, the formation of the first heat fusion region A causes significant deformation of this first heat fusion region A, and this deformation propagates to the subsequent second heat fusion region B, and is not likely to produce the straight second heat fusion region B. Accordingly, if the significant axial misalignment can occur, the length of the second heat fusion region B may sufficiently be elongated, to thereby gradually reduce the effect of the deformation of the first heat fusion region A, to produce the straight second heat fusion region B.

For example, if the significant axial misalignment can occur when the end of the core coating 5 of the holey fiber core 6 is held with the V-shaped groove holder 14-1, the second heat fusion region B may be 5 mm or more, and the holey fiber 1 may be cut at the midway point of this second heat fusion region B.

Also, when the discharge electrodes 15 are moved at a high speed, the difference between the fiber temperature during the first heat fusion region A formation (stationary heating) and the fiber temperature during the second heat fusion region B formation (moving heating) is significant, so that there is an effect that the deformation of the first heat fusion region A is not likely to propagate to the second heat fusion region B, due to the difference in the viscosity of the fused glass. Accordingly, the electric discharge current to be applied to the discharge electrodes 15 may more positively be varied so that the fiber temperature is high only during the first heat fusion region A formation (stationary heating).

According to the invention, it is possible to reduce the effect of the axial misalignment significantly. Therefore, according to the method of holding the end of the coating 5, it is possible to easily prevent the surface of the bare fiber from being flawed and deteriorated in strength, and reduce the connection loss when connecting with another optical fiber.

Figure 5:
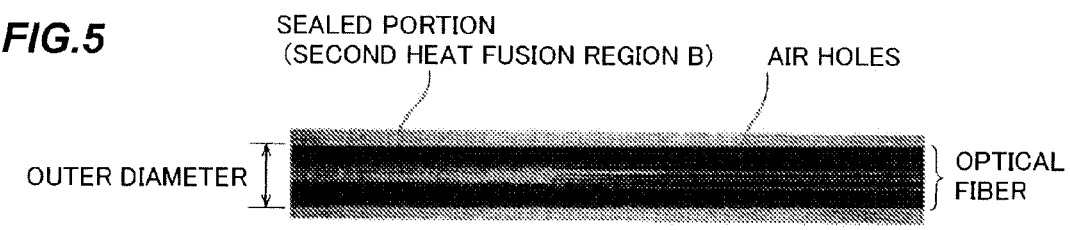
FIG. 5 is a microscopic photograph of a holey fiber end fabricated by an optical fiber end processing method in the first and second preferred embodiments according to the invention.

FIG. 5 is a microscopic photograph of an optical fiber end fabricated by the method as shown in FIGS. 2A to 2F in which the fiber pushing process is performed while forming the second heat fusion region B.

In the present preferred embodiment, the holey fiber is used as the optical fiber, and the outer diameter of the sealed portion (the second heat fusion region B) and the outer diameter of the non-sealed portion (holey fiber portion) with the air holes 4 therein are unchanged and constant (outer diameter=125 µm) along the longitudinal direction of the optical fiber 1, and the air holes 4 are gradually reduced in diameter toward a tip (in FIG. 5, left end) of the optical fiber, and are shaped in a tapered portion to disappear therein.

The end with the air holes is continuously changed in shape to be the tapered shape, so that the mode field of the propagating light does not change abruptly, which provides the good effect of reducing the optical connection loss and hardly causing a high order mode.

A specific method for producing the optical fiber end as shown in FIG. 5 will be explained below.

This optical fiber end is fabricated as follows: The discharge electrodes 15 are first stationary for 1 second for the electric discharge heating to form the first heat fusion region A, and subsequently are moved for 9 seconds for the electric discharge heating and the fiber pushing to form the second heat fusion region B. The optical fiber is then cut at the midway point of the second heat fusion region B, to provide the optical fiber end.

The moving velocity $V_e$ of the discharge electrodes 15 is 0.5 mm/sec. The fiber pushing is initiated at the same time as the discharge electrodes 15 are moved. The pushing velocity (the motioning velocity of the pushing motion mount 17) $V_f$ is 15 µm/sec, Also, the fiber pushing is terminated at the same time as the electric discharging is terminated. The total length of the heat fusion regions A and B (=first heat fusion region A+second heat fusion region B) is approximately 5 mm. Incidentally, it is preferable that the length of the heat fusion region B with the air holes 4 disappearing therein at the optical fiber end after cutting thereof is 1 mm or more.

In the first heat fusion region A (not shown in FIG. 5 because this region A has been removed in the step shown in FIG. 2F), an outer diameter compensation is not present.

Therefore, the outer diameter of the first heat fusion region A is smaller than that of the non-heated portion, but the outer diameter of the heat fusion region B is within a measuring accuracy of ±1.0 µM in the difference between the outer diameter of the heat fusion region B and the outer diameter of the non-heated portion, and is substantially the same as the outer diameter of the non-heated portion.

The outer diameter contraction of the first heat fusion region A (stationary heating portion) can be improved by initiating the fiber pushing prior to moving the discharge electrodes 15. However, because the first heat fusion region A is removed, the outer diameter adjustment thereof is not necessary when the heat fusion region B is provided with high accuracy (the straightness).

The stress due to slight axial misalignment is eliminated when the first heat fusion region A is formed (when the stationary heat fusion is performed), and the micro deformation of the first heat fusion region A is relaxed by the heat fusion portion moving, so that the fused portion is straight. When the variation in the outer diameter of the sealed portion is within ±1 µm, there is no problem with attachment to the connector. It is because such a degree of variation in the outer diameter of the optical fiber per se is allowable.

The outer diameter D of the sealed portion is determined by a balance between the discharge electrode moving velocity $V_e$ and the fiber pushing velocity $V_f$, and is therefore adjusted by adjusting the discharge electrode moving velocity $V_e$ and the fiber pushing velocity $V_f$. It should be noted, however, that change in the discharge electrode moving velocity $V_e$ causes variations in the fiber heating temperature, and it is therefore preferable to adjust only the fiber pushing velocity $V_f$ to adjust the outer diameter D of the sealed portion.

Figure 6A:
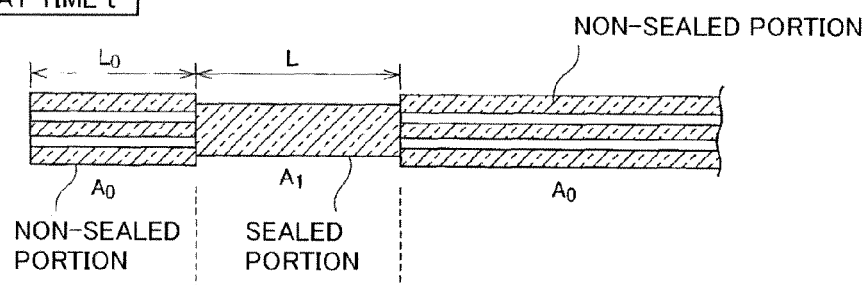
FIGS. 6A and 6B are diagrams showing a calculation model for obtaining a relationship between fiber pushing conditions and sealed portion outer diameter in the first and second preferred embodiments according to the invention.
Figure 6B:
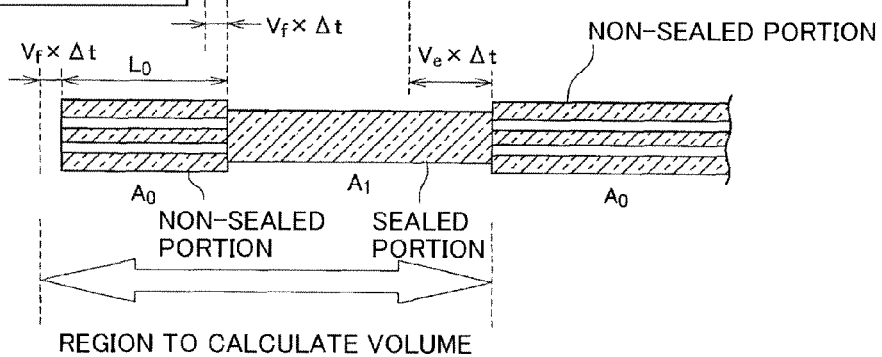

FIGS. 6A and 6B are diagrams showing a calculation model for obtaining a relationship between the fiber pushing conditions and the sealed portion outer diameter.

When the outer diameter of the fused portion is in a stationary state, FIG. 6A shows the state at a time t, while FIG. 6B shows the state at a time t+Δt after Δt seconds passed.

Assuming that the evaporation of silica glass when fused is negligible, and the volume of the fused portion does not vary, then the following equation (1) is established:

$$A_0 L_0 + A_0 V_e \times \Delta t + A_1 L = A_0 L_0 + A_1 (V_e \times \Delta t + L - V_f \times \Delta t) \quad (1)$$

The left-hand side of the equation (1) is the volume in the state of FIG. 6A, and the right-hand side thereof is the volume in the state of FIG. 6B. FIGS. 6A and 6B show a fiber region (a region as the calculation object of the volume) to calculate the volume.

Here, $A_0$ is a cross section area of the silica glass portion at the cross section of the non-sealed portion, $A_1$ is a cross section area of the silica glass in the sealed portion, $L_0$ is a length of the non-sealed portion at the fiber tip, L is a length of the sealed portion at the time t, $V_e$ is the moving velocity of the heating means (the discharge electrodes 15), and $V_f$ is a fiber pushing velocity.

The equation (1) is rewritten as the equation (2):

$$A_0 V_e = A_1 (V_e - V_f) \quad (2)$$

When an outer diameter of the holey fiber 1 before sealing is $d_f$, a diameter of the air holes 4 is $d_h$, the number of air holes 4 is n, and an outer diameter of the sealed portion is D, the equations (3) are established:

$$A_0 = \frac{\pi}{4}(d_f^2 - n d_h^2), \; A_1 = \frac{\pi}{4} D^2. \quad (3)$$

Therefore, substituting the equation (3) into the equation (2), the outer diameter D of the sealed portion is expressed by the equation (4):

$$D = \sqrt{\left(\frac{V_e}{V_e - V_f}\right) \cdot (d_f^2 - n d_h^2)}. \quad (4)$$

In the equation (4), when $V_e$ approaches $V_f$, D is great. This is because of deviating from the calculation model of FIGS. 6A and 6B. In actual fabrication conditions, $V_e \gg V_f$. There is therefore no problem with accuracy.

The value of $V_f$ for establishing $D = d_f$ is obtained as the equation (5) by substituting $D = d_f$ into the equation (4):

$$V_f = \left(\frac{n d_h^2}{d_f^2}\right) V_e. \quad (5)$$

Figure 7:
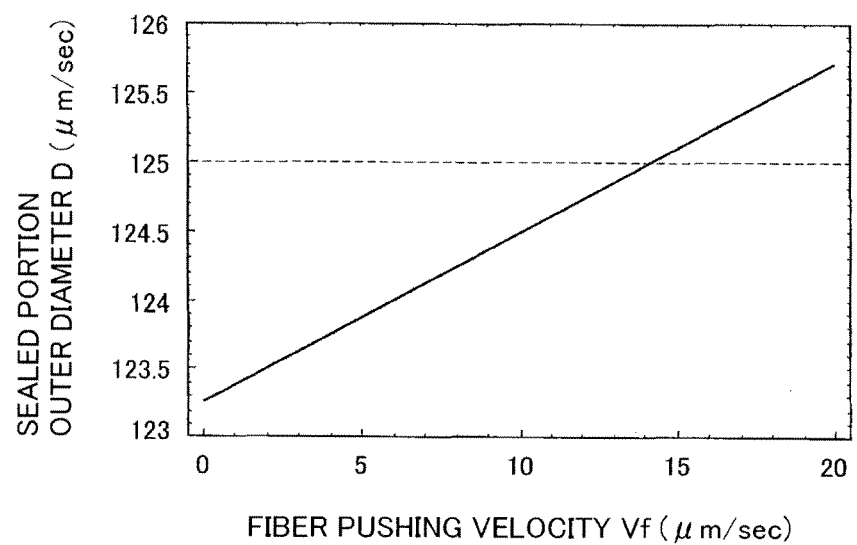
FIG. 7 is a graph showing a relationship between fiber pushing velocity $V_f$ and sealed portion outer diameter D, based on a theoretical formula.

FIG. 7 shows the relationship between the fiber pushing velocity $V_f$ and the sealed portion outer diameter D calculated with the equation (4). The fabricating conditions above shown in FIG. 5 are as follows: $V_e$=0.5 mm/sec, n=6, $d_h$=8.5 µm, and $d_f$=125.0 µm.

From FIG. 7, it is found that $V_f$=15 µm/sec given in the fabricating conditions is substantially equal to the condition of holding the outer diameter at 125 µm.

From the equation (5), $V_f$ is obtained to be 13.9 µm/sec, but as seen from FIG. 7, the variation in the sealed portion outer diameter D due to the difference in the pushing velocity $V_f$ is small. In heating conditions in which the evaporation of silica glass when fused is not negligible, the value of $V_f$ obtained from the equation (5) is interpreted as a lower limit, and it is preferable to obtain an experimentally greater optimal value for $V_f$.

The equations (4) and (5) are established in the case that the fiber pushing direction is the same as the discharge electrode moving direction. In the case that the fiber pushing direction and the discharge electrode moving direction are opposite to each other, the equations (6) and (7) corresponding respectively to the equations (4) and (5) are derived, and the equations (6) and (7) may be used to determine the fabricating conditions:

$$D = \sqrt{\left(1 + \frac{V_f}{V_e}\right) \cdot (d_f^2 - n d_h^2)}, \quad (6)$$

$$V_f = \left(\frac{n d_h^2}{d_f^2 - n d_h^2}\right) V_e. \quad (7)$$

Figure 8A:
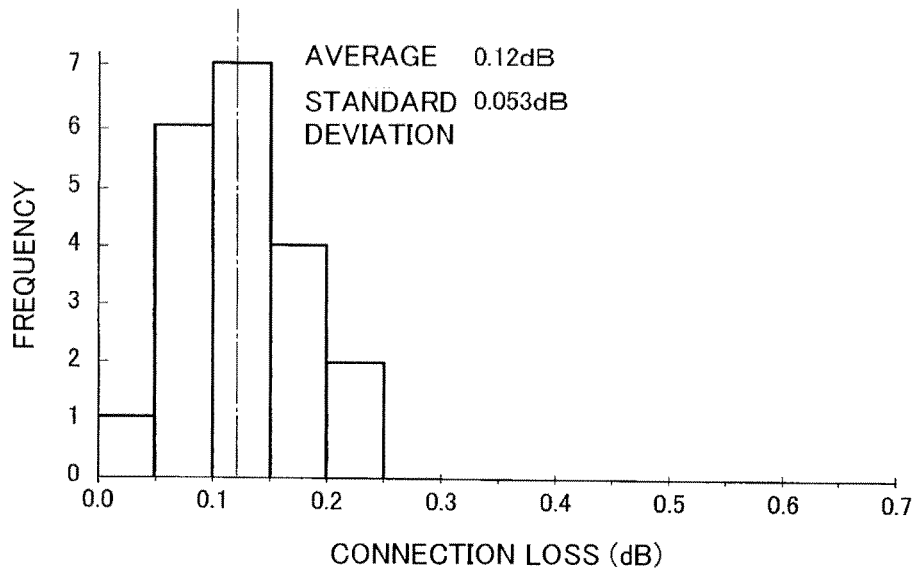

FIG. 8A is a histogram showing connector connection loss for twenty sealed portions fabricated in the fabricating conditions above shown in FIG. 5. The sealed portion production, and connector assembly were performed in a dust free clean room, and the connection loss with a master connector (a high precision connector with very small eccentricity which is fabricated with a single mode fiber) was measured. The wavelength of light for measurement is 1.55 µm. The average connection loss is 0.12 dB, and the standard deviation is 0.053 dB.

The average connection loss 0.12 dB is the low loss which is comparable to that with the single mode fiber. It is therefore proved that the fiber outer shape and the core deformation are in the micro level or less. In the sealed portion processing for twenty times, there was no defective product with a connection loss of 0.3 dB or more, and the stable property was achieved with good reproducibility.

Figure 8B:
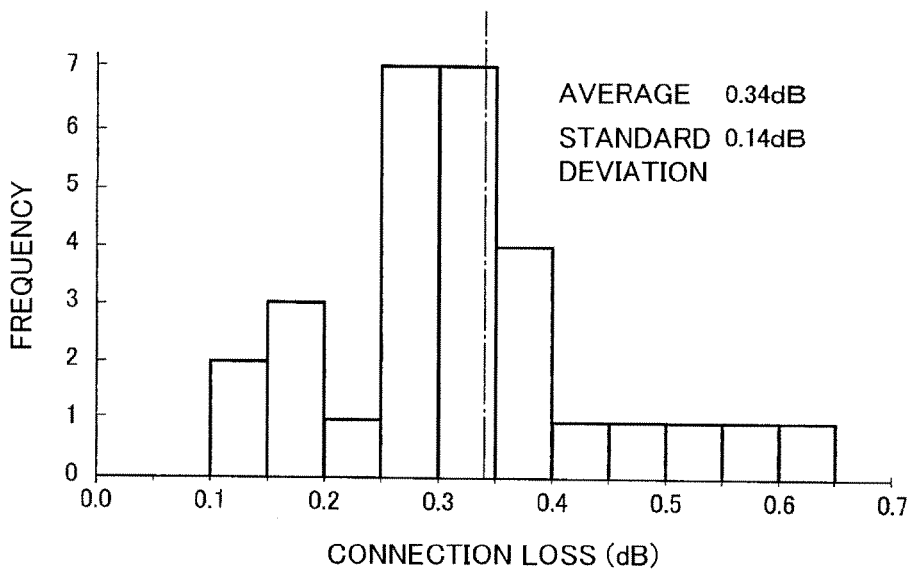

FIG. 8B is a histogram showing connector connection loss when only the fiber pushing velocity $V_f$=15 µm/sec of the fabricating conditions above shown in FIG. 5 is changed into $V_f$=0 µm/sec (when the fiber is not pushed). The number of samples is 30. The average connection loss is 0.34 dB, and the standard deviation is 0.14 dB. The connection loss increases nearly threefold by omission of the fiber pushing. The connector ferrule end was observed, and it is found that, in many of the samples, the fiber was eccentric in the fiber guiding hole 25 of the ferrule, and that the eccentricity of the fiber caused the increase in the loss. This means that the fiber is bent in the fusion sealed portion. The reason for that is as follows: Although the fiber outer diameter is reduced by omitting the fiber pushing, the fiber is positioned by the fiber guiding hole 25 in the non-sealed portion with a severalfold length of the fiber outer diameter. Accordingly, if the fiber is not bent in the sealed portion, no eccentricity must be given when the reduction in the sealed portion outer diameter has occurred.

On the other hand, when the fiber pushing of FIG. 8A is performed, in spite of no outer diameter shrink, the fusion sealed portion can be inserted into the fiber guiding hole 25 without resistance even when mounted to the ferrule. It is therefore clear that the fiber is not bent in the case of FIG. 8A.

Figure 9A:
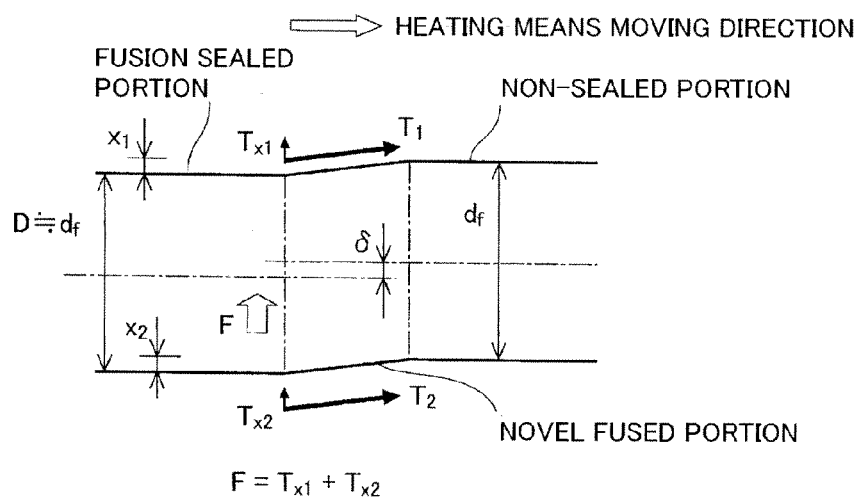
Figure 9B:
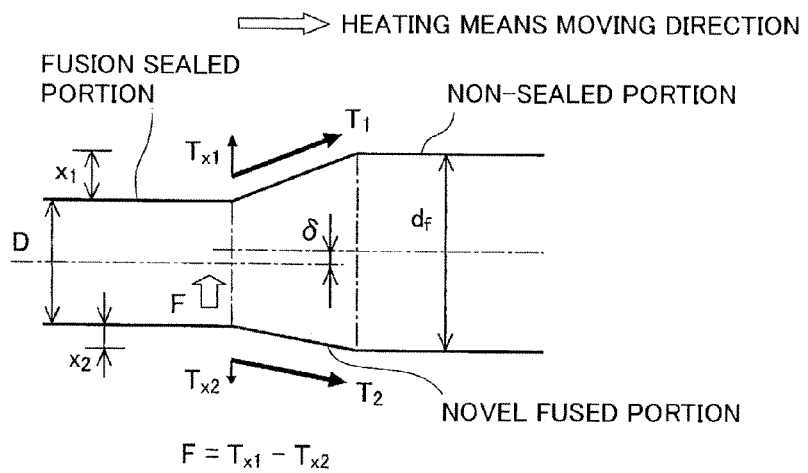

The reason and process for the generation of the bent in the fusion sealed portion can be explained as follows: FIGS. 9A and 9B are typical diagrams showing a boundary between the fusion sealed portion and the non-sealed portion when axial misalignment occurs. FIG. 9A shows the case (the case of the preferred embodiment according to the invention) where the outer diameter D of the sealed portion is made equal to the outer diameter $d_f$ of the non-sealed portion by the fiber pushing, while FIG. 9B shows the case where the fiber is not pushed and the outer diameter D of the sealed portion decreases. A surface depicted as being inclined is a novel fused portion formed by moving the heating means (the discharge electrodes 15), and where air holes disappear. No air holes are shown in FIGS. 9A and 9B. Also, in FIGS. 9A and 9B, δ is the axial misalignment between the non-sealed portion and the fusion sealed portion, each of $T_1$ and $T_2$ is a surface tension at each position of the fused portion, and each of $X_1$ and $X_2$ is a surface shift between the fusion sealed portion and the non-sealed portion at each position of the fused portion.

In FIG. 9A, a force F in the direction of reducing the axial misalignment δ acts on the fusion sealed portion on the left side. The force F is a total of respective force components $T_{x1}$ and $T_{x2}$ of the surface tensions $T_1$ and $T_2$, and even if the magnitudes of $T_{x1}$ and $T_{x2}$ are different, the force F acts in the same direction, and therefore lastingly as a stable self-aligning force. Accordingly, even if there is the axial misalignment between the fusion sealed portion and the non-sealed portion at a point, that the axial misalignment becomes small with the movement of the fusion portion by the self-aligning force F.

In FIG. 9B, on the other hand, the self-aligning force F is likewise caused by the surface tensions, but is unstable. The respective force components $T_{x1}$ and $T_{x2}$ of the surface tensions $T_1$ and $T_2$ are opposite to each other in direction, and the self-aligning force F is therefore the difference between $T_{x1}$ and $T_{x2}$. Accordingly, when the magnitudes of the force components $T_{x1}$ and $T_{x2}$ of the surface tensions $T_1$ and $T_2$ fluctuate, the self-aligning force F acting direction per se is not determined.

The fluctuation of the surface tensions $T_1$ and $T_2$ is caused largely by non-uniform heating and surface fluidization of the fused portion. The discharge plasmas between one pair of electrodes 15 are inhomogeneously distributed, and the surface temperature in the fiber circumferential direction is therefore non-uniform to some extent. Also, that causes the difference in the viscosity of each surface portion of the fused portion. Further, in the process of decreasing the outer diameter of the fused portion, the fused portion surface naturally becomes small, and a flow component into the fiber inside therefore also occurs to cause the fused portion surface to flow unstably. The unstable flow acts with the difference in the viscosity of each surface portion to generate the non-uniformity or fluctuation in the action of the surface tensions $T_1$ and $T_2$. Accordingly, the direction or magnitude of the self-aligning force F is not determined, so that the sealed portion is considered to tend to be bent.

In FIG. 9A, because the outer diameter contraction is prevented, the fused portion surface does not flow and the surface tensions $T_1$ and $T_2$ act stably. Accordingly, it is assumed that the direction of the self-aligning force F is not shifted even in the event of non-uniform heating, so that the resulting sealed portion is shaped to be straight.

Although the above explanation relates to the sealing of the single optical fiber, a fiber ribbon can be sealed collectively, by forming multiple V-shaped grooves on the V-shaped groove part, and fixing parallel-aligned bare fiber tips to on the pushing motion mount. The fiber alignment and the spatial arrangement of the discharge electrodes may be made in the same manner as in a commercial mass-fusion. According to this method, it is possible to attach an MT connector or an MPO connector easily to a fiber ribbon.

(Second Preferred Embodiment)

In a second preferred embodiment according to the invention, besides the holey fiber, a supporting fiber is used to process the holey fiber end.

FIGS. 10A to 10E show each step of an optical fiber end processing method in the second preferred embodiment according to the invention. FIGS. 10A to 10E are plan views showing optical fiber end processing using an optical fiber end processing apparatus, when viewed from above.

Figure 10A:
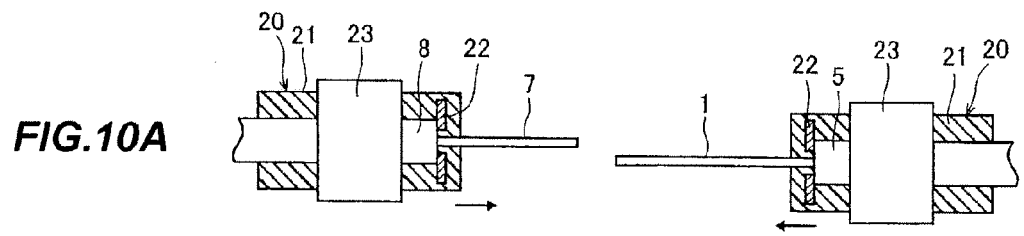
FIGS. 10A to 10E are diagrams showing processing steps of an optical fiber end processing method in a second preferred embodiment according to the invention.

Referring to FIG. 10A, the holey fiber 1 to be processed and a silica based supporting fiber 7 are first attached to the optical fiber end processing apparatus. In this preferred embodiment, a commercial fusion splicer with an aligning function is used as the optical fiber end processing apparatus. The supporting fiber 7 is attached to the fusion splicer after removing a coating 8 at an end. The supporting fiber 7 is used for mechanical supporting during heat fusion of the holey fiber 1, and no particular optical property is required for the supporting fiber 7. Accordingly, the supporting fiber 7 may be any kind of fiber, such as a coreless silica glass rod (silica glass wire).

As to the fusion splicer, although there is a type of attaching the coating directly to a micro motion mount, a type of attaching the coated fiber to a coated fiber holder 20 of the fusion splicer, and thereafter to the micro motion mount will be explained below. (In this type, there is an advantage in that the bare portion of the optical fiber is not required to be contacted with the other member such as the V-shaped grooves, so that the cladding surface is not flawed and is high in the reliability of the connected portion.) The coating 5 of the holey fiber 1 and the coating 8 of the supporting fiber 7 are each attached to the coated fiber holder 20. A coated fiber holder body 21 of the coated fiber holder 20 is formed with a coat stopper 22, so that coating ends of the coatings 5 and 8 are contacted with the coat stopper 22, to thereby position the coating ends. A coat clamp 23 is provided for clamping the coated fibers 5, 8. Immediately after both the fibers 1 and 7 are attached to the coated fiber holder 20, the respective axes of the fibers 1 and 7 are significantly misaligned with respect to each other. Thus, in the preprocessing for the axial alignment, the respective end faces of both the fibers 1 and 7 are first brought close to each other, based on the camera image data.

Figure 10B:
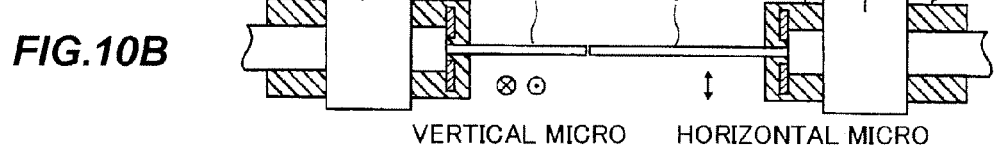

FIG. 10B shows the subsequent axial alignment. Based on the camera image data, the automatic alignment is made by reference to the respective outer shapes of the fibers 1 and 7. In FIGS. 10A to 10E, the alignment is made as follows: The holey fiber 1 attached to the coated fiber holder 20 on the right side is horizontally micro motioned parallel to the page upwardly and downwardly on the page, while the supporting fiber 7 attached to the coated fiber holder 20 on the left side is vertically micro-motioned vertically to the page.

Figure 10C:
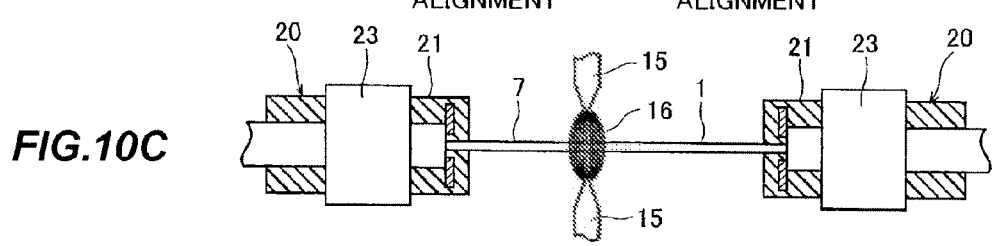

Referring to FIG. 10C, the holey fiber 1 and the supporting fiber 7 are thereafter fusion spliced together. Similarly to the first preferred embodiment, the fusion splice uses, e.g., one pair of discharge electrodes 15, for heating in the discharge plasma region 16 formed between the discharge electrodes 15. The optical characteristics of the fusion spliced portion fused by heating are not relevant, and detailed condition adjustment during the fusion splice is therefore not required. The electric discharge may be continued until the fluidization of the fiber fused portion resulting from splice heating stops. In typical fusion splice conditions, the electric discharge may be continued for a few seconds.

If the axial misalignment or angle misalignment occurs between the holey fiber 1 and the supporting fiber 7, a spliced heat fusion region A' in the fusion spliced portion deforms. Incidentally, the accuracy of the aligning function of the fusion splicer is high, and the axial misalignment can therefore be reduced by the optimization of the fusion splice conditions, but the angle misalignment between both the fibers 1 and 7 caused by the core holder 20 attachment cannot be overcome. The deformation of the spliced heat fusion region A' due to this angle misalignment interferes with, e.g., the optical fiber insertion into the fiber guiding hole 25 in the connector ferrule.

Figure 10D:
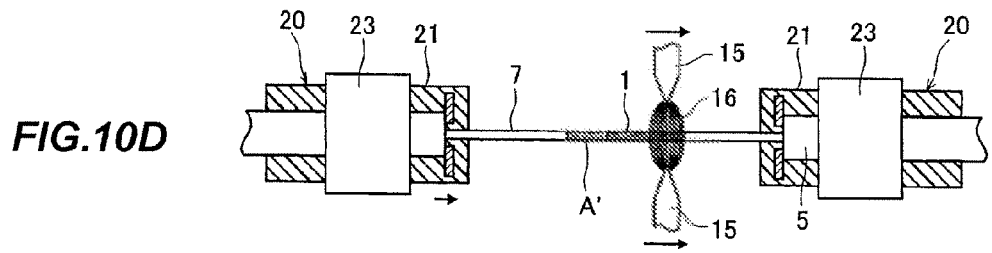

Referring next to FIG. 10D, after the formation of the spliced heat fusion region A', the electric discharge heating is continued without stopping the electric discharge, and the discharge electrodes 15 are moved along the direction on the side of the holey fiber 1 (right direction in FIG. 10D) from the spliced heat fusion region A', while the coated fiber holder 20 to which the supporting fiber 7 is attached is pushed toward the holey fiber 1, i.e. the fused portion, thereby forming a fiber heat fusion region B'. This fiber heat fusion region B' corresponds to the second heat fusion region B in the first preferred embodiment. The fiber heat fusion region B' may be formed by pushing the coated fiber holder 20 of the holey fiber 1 toward the supporting fiber 7. The fiber pushing is not required to be initiated at the same time as the discharge electrodes 15 moving is initiated, but the fiber pushing must be initiated after the holey fiber 1 has fused. The pushing velocity of the supporting fiber 7 (the micro motion mount motioning velocity) is set in the same way as in the first preferred embodiment to prevent the variation in the outer diameter of the fiber heat fusion region B'. In this manner, the air holes 4 of the holey fiber 1 are caused to disappear without variation in the outer diameter. As a result, the fiber heat fusion region B' in which the air holes 4 disappear is formed in the holey fiber 1.

Figure 10E:
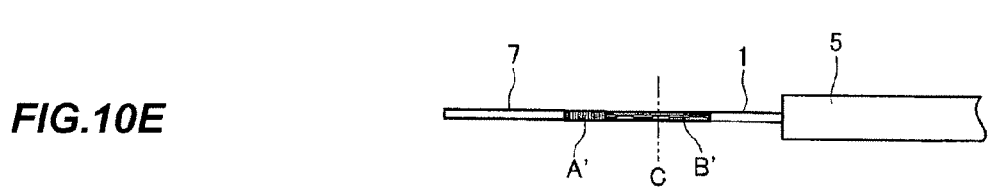

Referring to FIG. 10E, the holey fiber 1 may be cut at a position C to be cut within the fiber heat fusion region B' of the holey fiber 1, to remove the spliced heat fusion region A' which is the fusion spliced portion.

The moving of the discharge electrodes 15 in this preferred embodiment can be performed with the use of the commercial fusion splicer with the aligning function. The commercial fusion splicer having the aligning function has, e.g., a function called sweep discharge, so that after the fusion splice, the discharge electrodes 15 can be reciprocated for heat processing. Further, the discharge heating in this preferred embodiment can be automated with the fusion splicer by slightly altering the operation program of the fusion splicer. Similarly, by altering the operation program, it is possible to fuse the holey fiber 1 by heating, while pushing the holey fiber 1 at the same time, thereby forming the fiber heat fusion region B' without varying the outer diameter.

Still further, the position information of the core coating end of the coating 5 is known to the fusion splicer by providing the coated fiber holder 20 with the stopper 22, and it is therefore possible to precisely control the length from the coating end to the middle of the fiber heat fusion region B'. Also, with a commercial optical fiber cutter, the cutting can be performed with the fiber mounted to the coated fiber holder 20 of the fusion splicer, and it is therefore possible to obtain the high accuracy position C to be cut.

Although the above described fusion splicer has the aligning function, the invention can be also practiced by a fixing V-shaped groove type fusion splicer, which is based on the axial alignment principle utilizing a part equivalent to the V-shaped groove part 10 in the first preferred embodiment, which is such configured that the sweep discharge can be performed by the electrode moving and the operation program implementation therefor. In this case, the bent of the spliced heat fusion region A' is caused by the initial axial misalignment, similarly to that of the first heat fusion region A in the first preferred embodiment. According to the fixing V-shaped groove type fusion splicer, it possible to splice multiple fibers collectively by multiple V-shaped grooves. Therefore, there is an advantage in that the multiple fibers batch sealing processing can be performed when an MT connector is attached to the fiber ribbon of the holey fiber 1. Further, according to the mass-fusion splicer having such a function, it is possible to perform the multiple fiber batch sealing based on the first preferred embodiment with the more simple task, by fixing the bare fiber portion to the coated fiber holder 20 on the side on which the fiber pushing can be done.

Although in the first and second preferred embodiments it has been described that the electric discharge is used for heating the optical fiber, besides the electric discharge, a carbon dioxide laser or a carbon heater which has been utilized for fusion splice may be used as the heat fusion means. Also, according to the optical fiber end processing method according to the invention, it is possible to seal the air holes of the optical fiber including the air holes, suppress the increase in loss, and maintain the high reliability. The optical fiber end processing method can be applied to the attachment and splicing of both of the single fiber connector and the multifiber connector. Further, the optical fiber end processing method can contribute to future various applications, such as holey fibers, photonic crystal fibers, and the like.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. An optical fiber end processing method for processing an end of an optical fiber comprising a core, a cladding provided around a circumference of the core, a plurality of air holes formed around the core within the cladding and along an axial direction of the core, comprising:
    an optical fiber fixing step of fixing two portions of an optical fiber;
    a first heat fusion region forming step of heating and fusing the optical fiber between the two fixed portions by a heat fusion means after the optical fiber fixing step, to form a first heat fusion region in the optical fiber;
    a second heat fusion region forming step of heating and fusing the optical fiber between the two fixed portions by the heat fusion means while fixing the two fixed portions after the first heat fusion region forming step, moving the heat fusion means from a side of the first heat fusion region toward a base end side of the optical fiber, and pushing a heat fusion portion of the optical fiber in a direction of shortening a length of the heat fusion portion along the axial direction in synchronization with a movement of the heat fusion means, to form a second heat fusion region which is continuous to the first heat fusion region and in which the air holes of the optical fiber disappear; and
    a removal step of removing the first heat fusion region by cutting the optical fiber within the second heat fusion region after the second heat fusion region forming step.

2. The optical fiber end processing method according to claim 1, wherein the optical fiber further comprises a coating formed around a circumference of the cladding,
    wherein the optical fiber fixing step further comprises removing the coating located at the end of the optical fiber to expose a part of the cladding, and fixing a bared portion of the exposed cladding of the optical fiber and a portion of the coating as the two fixed portions.

3. The optical fiber end processing method according to claim 1, wherein the heat fusion portion of the optical fiber is pushed in the direction to shorten the length of the heat fusion portion in the axial direction such that a diameter of the optical fiber located in the second heat fusion region is substantially equal to a diameter of the optical fiber at a non-heated portion which is not heated by the heat fusion means in the second heat fusion region forming step.

4. An optical fiber end processing method for processing an end of an optical fiber comprising a core, a cladding provided around a circumference of the core, a plurality of air holes formed around the core within the cladding and along an axial direction of the core, comprising:
- a fiber fixing step of fixing the optical fiber and a supporting fiber in a state where end faces of the optical fiber and the supporting fiber are facing to each other;
- a spliced heat fusion region forming step of heating and fusing the optical fiber and the supporting fiber by a heat fusion means after the fiber fixing step, thereby fusion splicing the optical fiber and the supporting fiber to form a spliced heat fusion region;
- a fiber heat fusion region forming step of heating and fusing the optical fiber by the heat fusion means while fixing the optical fiber and the supporting fiber after the spliced heat fusion region forming step, moving the heat fusion means from a side of the spliced heat fusion region toward a side of the optical fiber, and pushing a heat fusion portion of the optical fiber in a direction of shortening a length of the heat fusion portion along the axial direction in synchronization with a movement of the heat fusion means, to form a fiber heat fusion region which is continuous to the spliced heat fusion region and in which the air holes of the optical fiber disappear; and
- a removal step of removing the spliced heat fusion region by cutting the optical fiber within the fiber heat fusion region after the fiber heat fusion region forming step.

5. The optical fiber end processing method according to claim 4, wherein the heat fusion portion of the optical fiber is pushed in the direction to shorten the length of the optical fiber in the axial direction such that a diameter of the optical fiber located in the fiber heat fusion region is substantially equal to a diameter of the optical fiber at a non-heated portion which is not heated by the heat fusion means in the second heat fusion region forming step.

6. The optical fiber end processing method according to claim 1, wherein the end of the optical fiber after the end processing is inserted, bonded and fixed to a ferrule, an end face of the ferrule is thereafter ground, and a region in which the air holes disappear at the end of the optical fiber is positioned at the end face of the ferrule after being ground.

7. An optical fiber end processing apparatus for performing the optical fiber end processing method according to claim 1, comprising:
- a fiber fixing means for fixing the two portions of the optical fiber;
- the heat fusion means for heating and fusing the optical fiber;
- a control means for controlling the heat fusion means to form the first heat fusion region and the second heat fusion region in the optical fiber between the two fixed portions fixed by the fiber fixing means; and
- a pushing means for pushing the heat fusion portion of the optical fiber in the direction of shortening the length of the heat fusion portion along the axial direction when the second heat fusion region is formed.

8. An optical fiber end processing apparatus for performing the optical fiber end processing method according to claim 4, comprising:
- a fiber fixing means for fixing the optical fiber and the supporting fiber;
- the heat fusion means for heating and fusing the optical fiber and the supporting fiber;
- a control means for controlling the heat fusion means to form the spliced heat fusion region and the fiber heat fusion region in the optical fiber and the supporting fiber fixed by the fiber fixing means; and
- a pushing means for pushing the heat fusion portion of the optical fiber in the direction of shortening the length of the heat fusion portion along the axial direction when the fiber heat fusion region is formed.

9. An optical fiber end processing method, comprising:
- an optical fiber fixing step of fixing two portions of an optical fiber including air holes in a cladding, the air holes extending along an axial direction;
- a heating step of heating the optical fiber fixed between the two fixed portions in the optical fiber fixing step; and
- an optical fiber pushing step of pushing the optical fiber to shorten a length of the optical fiber between the two fixed portions when heating the optical fiber in the heating step.

10. The optical fiber end processing method according to claim 9, wherein the heating step is performed to heat the optical fiber from a tip side to a base end side of the optical fiber.

* * * * *